United States Patent [19]

Patton

[11] Patent Number: 5,057,724
[45] Date of Patent: Oct. 15, 1991

[54] CERAMIC MAGNET MOTOR

[76] Inventor: James V. Patton, 1202 E. 9th St., No. 1, Gillette, Wyo. 82716

[21] Appl. No.: 465,474

[22] Filed: Jan. 16, 1990

[51] Int. Cl.$^5$ ............................................. H02K 33/12
[52] U.S. Cl. ........................................ 310/17; 310/15; 310/16; 417/418
[58] Field of Search ........................... 310/15, 16, 17; 417/417, 418

[56]  References Cited

U.S. PATENT DOCUMENTS

| 3,754,154 | 8/1973 | Massie .................... 310/30 |
| 4,259,653 | 3/1981 | McGonigal . | |
| 4,454,426 | 6/1984 | Benson . | |
| 4,583,027 | 4/1986 | Parker . | |
| 4,638,193 | 1/1987 | Jones . | |
| 4,692,673 | 9/1987 | DeLong ................... 318/132 |
| 4,838,771 | 6/1989 | Kikuchi ................... 417/417 |
| 4,909,712 | 3/1990 | Mortensen ............... 417/360 |

FOREIGN PATENT DOCUMENTS

| 3633775 | 4/1988 | Fed. Rep. of Germany ........ 310/15 |
| 0073860 | 4/1988 | Japan ................................ 310/15 |
| 1379897 | 3/1988 | U.S.S.R. ........................... 310/15 |

Primary Examiner—Steven L. Stephan
Assistant Examiner—Judson H. Jones
Attorney, Agent, or Firm—Terry M. Gernstein

[57]  ABSTRACT

A motor has a plurality of pistons each of which has a ceramic magnet mounted thereon. The ceramic magnets are permanently polarized, and each piston is mounted in a cylinder to reciprocate within that cylinder. An electromagnet is located at each end of each cylinder, and is energized to alternately attract and repel the ceramic magnet so that the piston is caused to reciprocate in the cylinder under the influence of the electromagnets. Hydraulic fluid is drawn into the cylinder and is forced out of that cylinder as the piston reciprocates and this fluid is used to drive a turbine which in turn is used to generate mechanical power.

3 Claims, 7 Drawing Sheets

CERAMIC MAGNET MOTOR

TECHNICAL FIELD OF THE INVENTION

The present invention relates to the general art of prime movers, and to the particular field of positive displacement pumps.

BACKGROUND OF THE INVENTION

The positive displacement pump has long been used to move fluid from one place to another. These pumps are generally driven by electricity or by an internal combustion engine. As is well known, these pumps have been extremely successful.

However, there is always need for new designs for such mechanisms, especially in view of the polluting nature of the internal combustion engine and the basic inefficiencies and control problems associated with many electric motors. Furthermore, the internal combustion engine also has a noise problem, and both engines have several major moving parts so that reliability and longevity can become problems. These problems may inhibit the use of such pumps in some applications.

Therefore, there is a need for a positive-displacement type pump which differs from both the electric-motor driven pump and the gasoline-motor driven pump whereby new applications will have an additional choice of pump design, and which includes a minimum number of major moving parts and does not create a noise or air pollution problem.

OBJECTS OF THE INVENTION

It is a main object of the present invention is to provide a positive-displacement type pump which differs from both the electric-motor driven pump and the gasoline-motor driven pump It is another object of the present invention to a positive-displacement type pump which differs from both the electric-motor driven pump and the gasoline-motor driven pump whereby new applications Will have an additional choice of pump design.

It is another object of the present invention to a positive-displacement type pump which differs from both the electric-motor driven pump and the gasoline-motor driven pump whereby new applications will have an additional choice of pump design, and which includes a minimum number of major moving parts.

It is another object of the present invention to a positive-displacement type pump which differs from both the electric-motor driven pump and the gasoline-motor driven pump whereby new applications will have an additional choice of pump design, and which includes a minimum number of major moving parts and does not create a noise or air pollution problem.

SUMMARY OF THE INVENTION

These, and other, objects are achieved by a motor which uses magnetic attraction between ceramic magnets and electromagnets to move pistons back and forth in pumping cylinders. Fluid is drawn into the cylinders from a low pressure source and is delivered from the cylinders to a high pressure storage tank for use by hydraulic rotors or the like to generate power. Electric power for the electromagnets is supplied by an electric circuit such as used in an ic automobile engine which includes elements which control sequencing of the electromagnets as well as operation of fluid valves associated with a fluid circuit of the motor. Power can be removed from the motor via suitable mechanical linkages.

In this manner, the number of moving parts associated with the motor is reduced from other motors, and control of pump output can be effected in a manner that differs from, and in many cases is easier than, electric motor driven pumps and internal combustion engine driven pumps. Noise and air pollution are also reduced as compared to internal combustion engines and the longevity of the motor is increased over many presently available engines and motors.

DETAILED DESCRIPTION OF THE PREFERRED EMBODIMENT OF THE INVENTION

Figure 1:
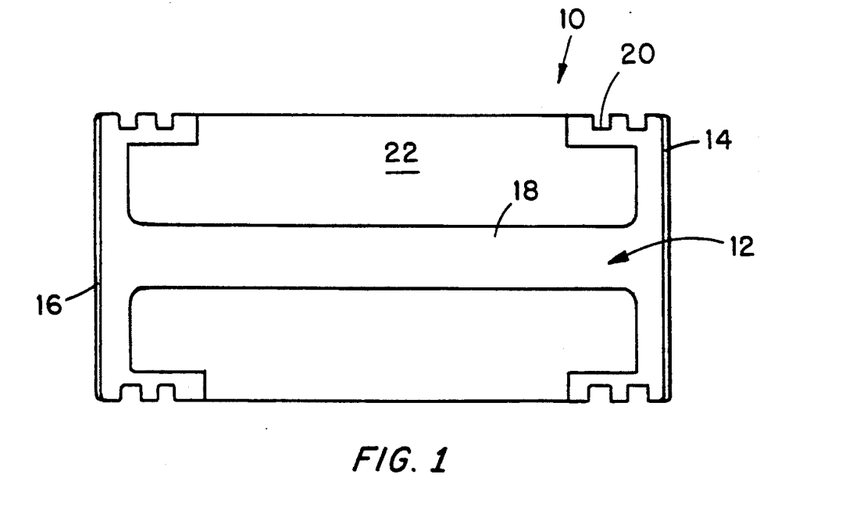
FIG. 1 is a side elevational view of a piston having a ceramic magnet thereon as used in the motor of the present invention.

Shown in FIG. 1 is a piston 10 that is used to move hydraulic fluid in a positive displacement pump of the present invention. The piston 10 includes a core 12 of magnetizable material and which a first face 14 and a second face 16 connected together by a body 18 that extends along a longitudinal centerline of the piston. The motor of the present invention includes a plurality of such pistons, and all are identical to the piston shown in FIG. 1. For example, the motor can include three, four, eight or more pistons. The piston faces include grooves 20 into which suitable rings (not shown) are placed.

A ceramic magnet 22 is placed on each piston and is molded to fit around the body and between the faces as shown in FIG. 1. The piston thus has a polarity as determined by the polarity of the magnet 22.

Figure 2:
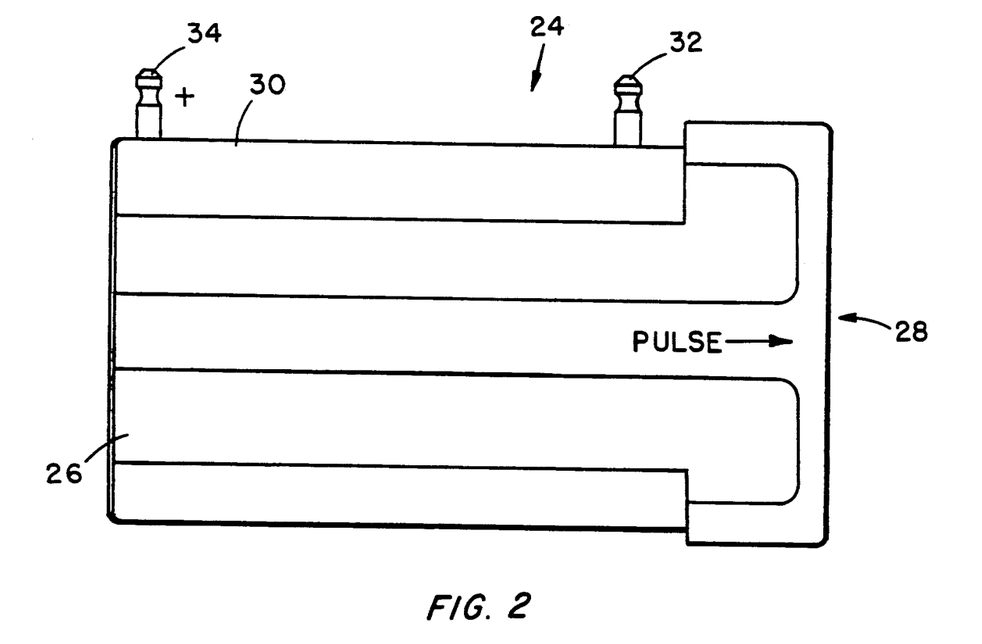
FIG. 2 is a schematic illustration of an electromagnet used in the motor of the present invention.
Figure 3:
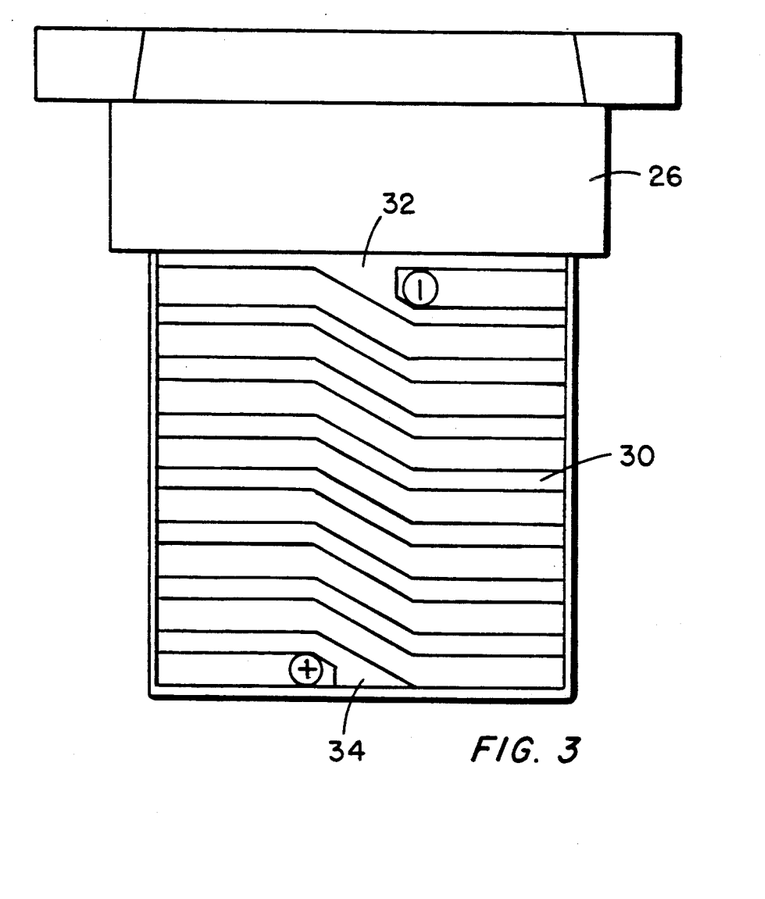
FIG. 3 is a side elevational view of an electromagnet used in the motor of the present invention.
Figure 4:
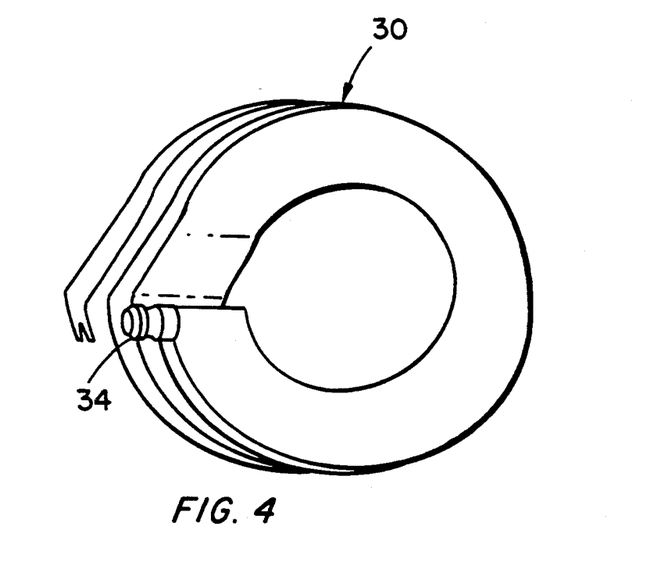
FIG. 4 is perspective view of a portion of the electromagnet used in the motor.

Each cylinder of the motor also includes an electromagnet associated with each face of the piston, and all of the electromagnets are identical to electromagnet 24 shown in FIG. 2. The electromagnet 24 includes a core 26 of magnetizable material and has a first face 28 located to be closely adjacent to the first face 14 of the piston. A suitable winding 30 is fixed to the core as shown in FIGS. 2, 3 and 4, and has a first terminal 32 and a second terminal 34 which are suitably attached to a power source as will be described below.

There is one electromagnet adjacent to each end of each piston, and the terminals are connected to the power source to change polarity in accordance with a predetermined program. Since the ceramic magnet is a permanent magnet and has fixed polarity, changing the polarity of the electromagnets will alternately attract and repel the ceramic magnets on the pistons towards and away from any particular electromagnet. This alternating attracting and repelling will cause the pistons to reciprocate in a pumping motion.

Figure 5:
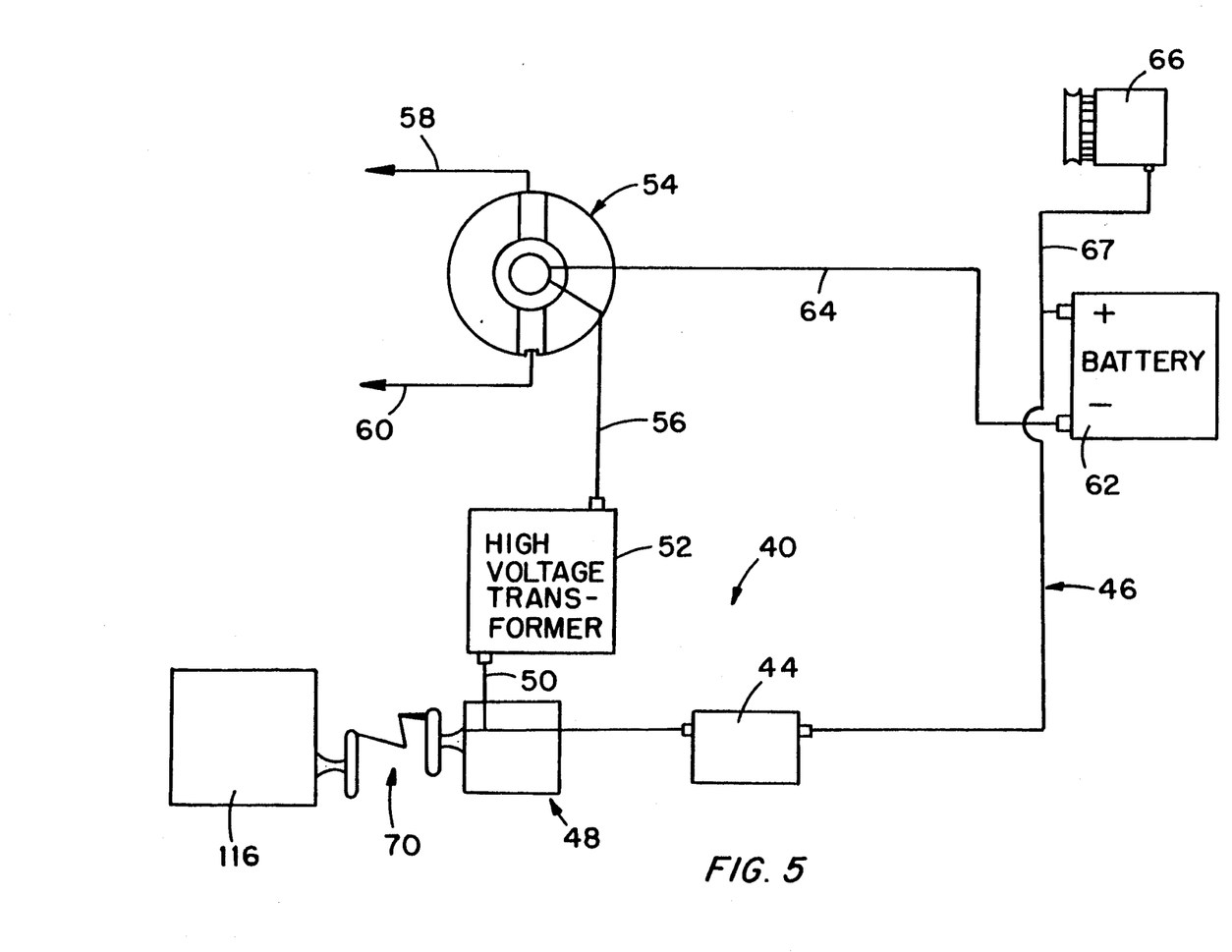
FIG. 5 illustrates the electric circuit associated with the motor.

The electromagnets are powered using an electric circuit 40 that is best illustrated in FIG. 5. The circuit 40 includes a power source 62, such as a storage battery or the like, connected to a step-up transformer 44 by a line conductor. The step-up transformer can step the voltage up from twelve volts to one hundred twenty volts or the like, and is connected to a rheostat 48. The rheostat 48 is connected by a line conductor 50 and to a high voltage transformer 52, which is connected to a distributor 54 by a line conductor 56. The distributor sequentially energizes the electromagnets of the motor via line conductors 58 and 60 so that each piston is simultaneously repelled by one electromagnet associated therewith and attracted by the other electromagnet associated therewith. The distributor sequentially energizes the electromagnets so that the pistons operate sequentially to move fluid to and through the motor as will be apparent from the present disclosure. The storage battery 62 is connected to the distributor 54 via line conductor 64 and is also connected to an alternator 66 by a line conductor 67. Further batteries can also be included. A mechanical linkage 70 adjusts the current and voltage associated with the circuit 116 which includes a high pressure fluid regulator means.

Figure 6:
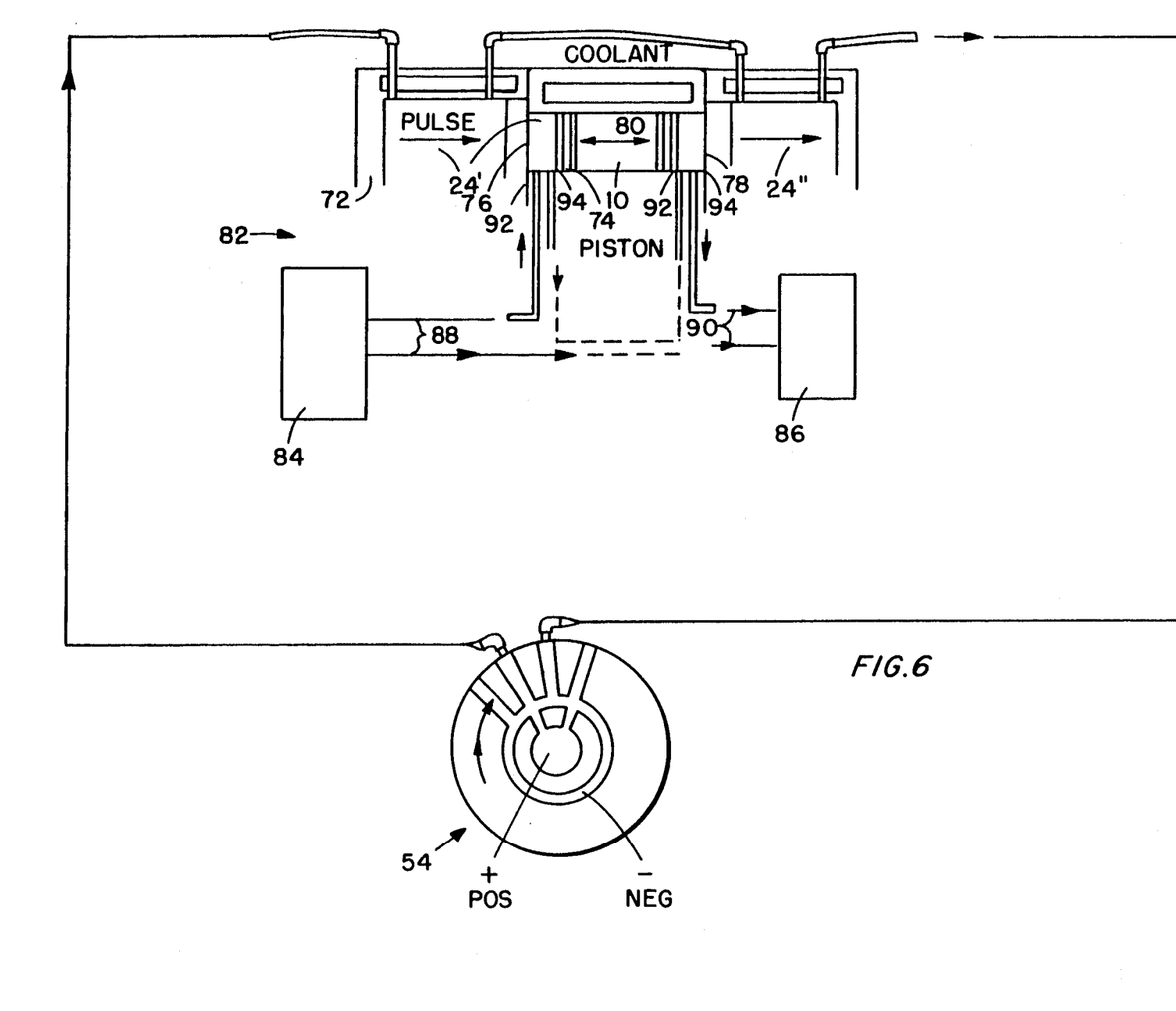
FIG. 6 is a schematic illustrating the fluid circuit associated with the motor.
Figure 7:
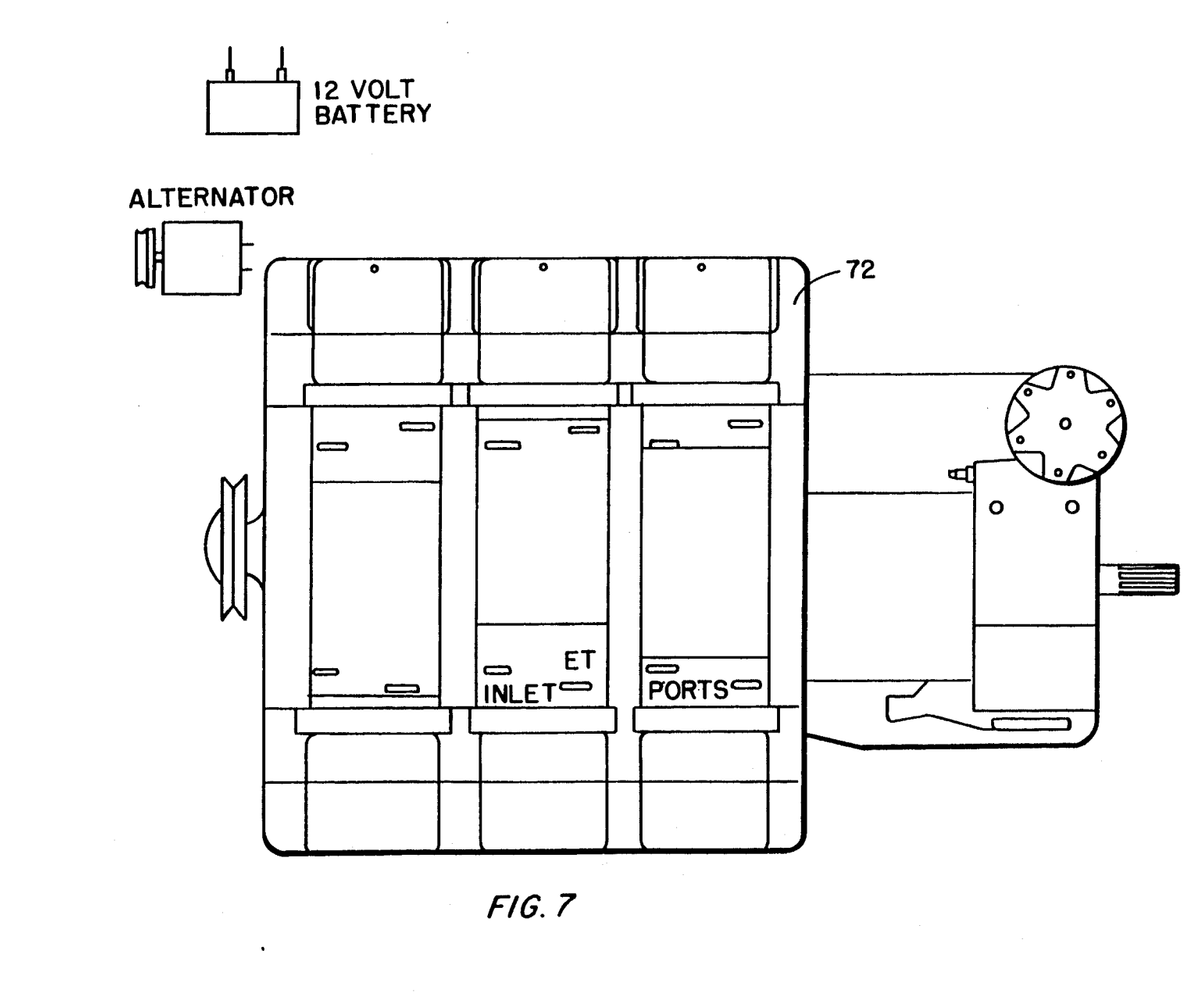
FIG. 7 illustrates a top view of the motor.
Figure 8:
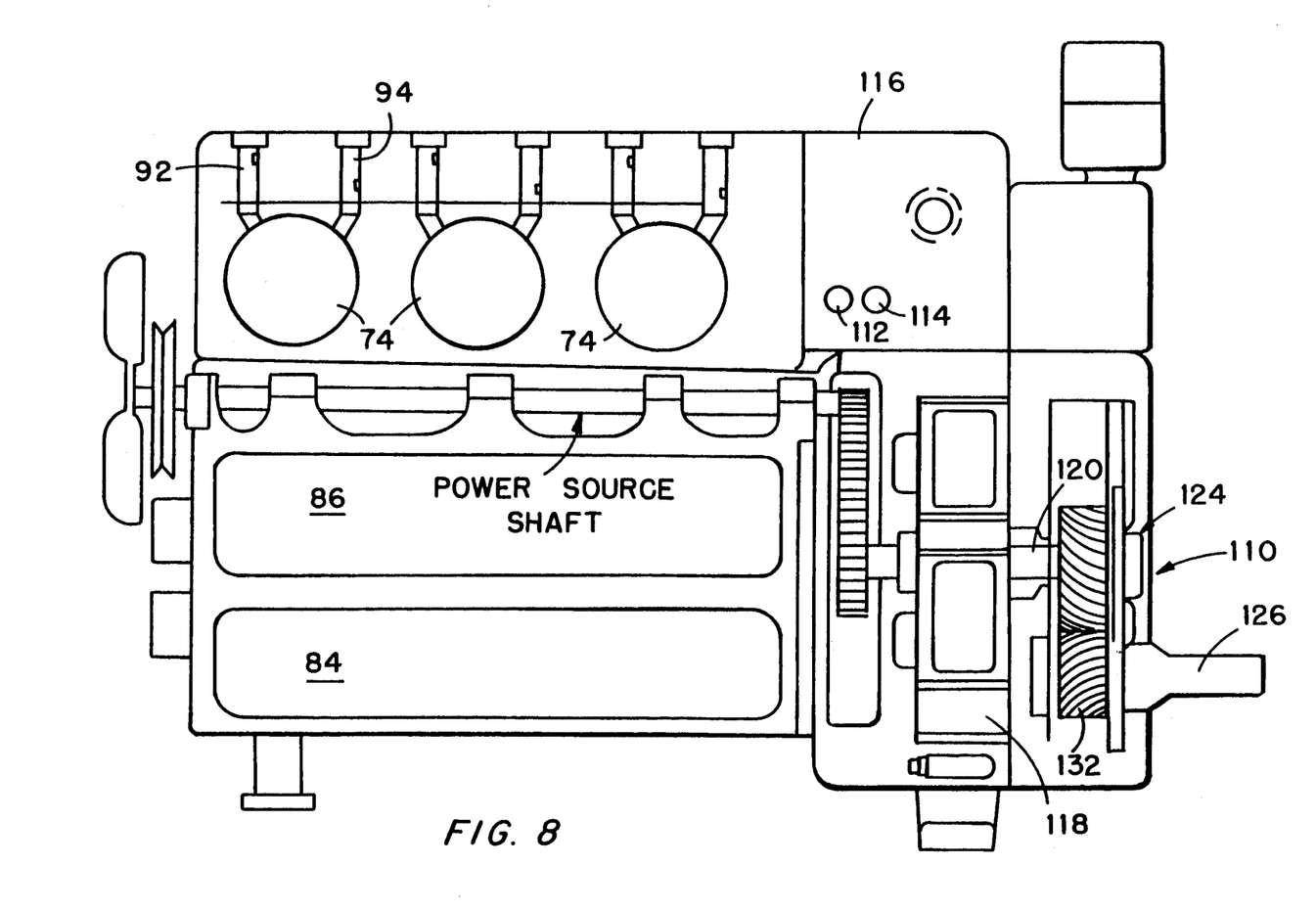
FIG. 8 illustrates a side view of the motor.

Referring to FIGS. 6, 7 and 8, it is seen that the motor includes a block 72 that is similar to an engine block, and a plurality of cylinders 74 are defined in that block, with each cylinder being closed and fluid tight and each cylinder having a piston located therein to reciprocate from one end 76 of the cylinder to the other end 78 thereof as indicated in FIG. 6 by the double-headed arrow 80. As shown in FIG. 6, a first electromagnet 24' is located adjacent to the cylinder first end 76 and a second electromagnet 24" is located adjacent to the cylinder second end 78, with both of the electromagnets being connected to the distributor to be operated as above described to simultaneously attract and repel the piston and to then reverse polarity to simultaneously repel and attract that same piston to cause it to move in the reciprocating motion indicated.

The motor also includes a fluid circuit that is best illustrated in FIG. 6. The fluid circuit 82 includes a low pressure hydraulic fluid source 84 and a high pressure hydraulic fluid storage tank 86 fluidically connected to the piston cylinders by low pressure conduits 88 and high pressure conduits 90 respectively. The conduits are fluidically connected to the cylinder by inlet valves 92 and by return valves 94 on the cylinder ends.

As the piston reciprocates in the cylinder, hydraulic fluid is drawn from the low pressure tank 84 into one end of the cylinder and is forced at a high pressure into the high pressure tank 86 as the piston is repelled away from the one end and is attracted to the other end. The valves are sequenced to open the inlet valve associated with the first end and close the return valve associated with that first end while opening the return valve associated with the other end and closing the inlet valve associated with that other end, and to thereafter reverse such valve position as the piston moves in the opposite direction after the polarity of the electromagnets is reversed.

Hydraulic fluid is thus moved from the low pressure tank into the high pressure tank as the piston moves back and forth in the cylinder.

The fluid circuit also includes a block cooling system having inlet conduits, shunt conduits around the cylinders and return conduits, all of which are embedded in the block and connected to a source of coolant, such as water, and to a reservoir for such coolant. The battery 62 and alternator 66 can be used to power this block cooling circuit if suitable.

Figure 9:
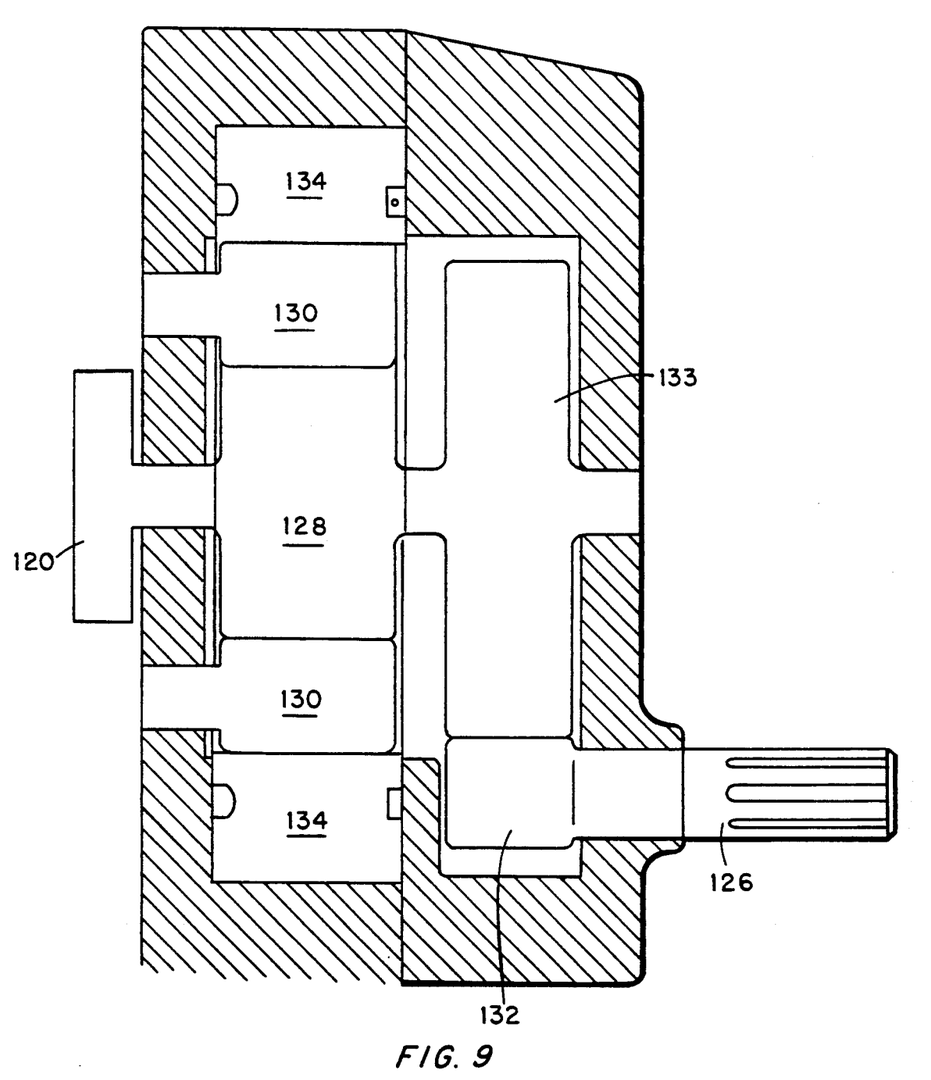
FIG. 9 illustrates a gear linkage suitable for removing power from the motor.

Referring to FIGS. 8 and 9, it is seen that the motor includes a power take-off mechanism 110 that is driven by the hydraulic fluid being pumped from the cylinders. The take-off mechanism includes a high pressure fluid conduit 112 fluidically connected to the high pressure tank 86 and a low pressure return conduit 114 fluidically connected to the low pressure tank 84. The conduits are also fluidically connected to a hydraulic regulator 116 that is connected to a rotor turbine 118. Hydraulic fluid drives the rotor 118, and a drive shaft 120 is mounted on the block and attached to the rotor for rotation therewith. A gear assembly 124 connects the drive shaft to a power take-off shaft 126 whereby mechanical power is taken out of the motor.

As indicated in FIG. 9, the gear assembly 124 is preferably a planetary gear system with a sun gear 128 connected to the drive shaft 120 and planet gears 130 engaging that sun gear to establish a suitable RPM. Other gears 132 and 133 are also included in the system and a rotor 134 is also included.

The fluid circuit also includes a fluid recirculator that is fluidically connected to the rotor turbine 118 or to a torque converter or other such element. The fluid recirculator is connected to the rheostat. A fan and a water pump are also included in the motor and are driven by power from the power source. Fluid coming out of the rotor goes through a back pressure valve then, byu a line to a fluid cooling systsem in the radiator, and back to the low pressure tank.

Operation of the motor has been discussed above, and thus will not be reiterated.

It is understood that while certain forms of the present invention have been illustrated and described herein, it is not to be limited to the specific forms or arrangements of parts described and shown.

I claim:

1. A positive-displacement pump motor comprising:
   A) a block having a plurality of cylinders, each cylinder being a closed chamber with a first end and a second end;
   B) a plurality of pistons, each piston being mounted in one cylinder of said plurality of cylinders to reciprocate back and forth in that cylinder from adjacent to said first end to adjacent to said second end and visa versa, and each including
      (1) a core of magnetizable material,
      (2) a first face on one end of said core,
      (3) a second face on another end of said core, and
      (4) a magnetic molded ceramic magnet surrounding said core and extending between said faces;
   C) a first electromagnet mounted on said block adjacent to each cylinder first end and having a first polarity when energized in a first manner and a second polarity when energized in a second manner with said first polarity being opposite to said second polarity;
   D) a second electromagnet mounted on said block adjacent to each cylinder second end and having a first polarity when energized in a first manner and a second polarity when energized in a second manner with said first polarity being opposite to said second polarity, said first electromagnet first polarity being opposite to said second electromagnet first polarity, and said first electromagnet second polarity being opposite to said second electromagnet second polarity so that when both said first and said second electromagnets associated with one piston are simultaneously energized in a first manner, the one piston is simultaneously attracted to one of said electromagnets and repelled by the other of said electromagnets and visa versa for said second manner;

E) a power source;

F) electric circuit means for sequentially connecting all of said first and second electromagnets to said power source to sequentially operate all of said pistons, said electric circuit means including
  (1) a step-up transformer connected to said power source,
  (2) a rheostat connected to said step-up transformer,
  (3) a second transformer connected to said rheostat, and
  (4) a distributor connecting said second transformer to each of said electromagnets to sequentially connect each of said electromagnets to said power source;

G) a fluid circuit system which includes
  (1) a low pressure hydraulic fluid source,
  (2) a high pressure hydraulic fluid storage tank,
  (3) a first inlet valve on each cylinder first end,
  (4) a second inlet valve on each cylinder second end,
  (5) a first return valve on each cylinder first end,
  (6) a second return valve on each cylinder second end, H) a power take off mechanism which includes
  (1) a high pressure fluid conduit fluidically connected to said high pressure hydraulic fluid storage tank,
  (2) a hydraulic regulator fluidically connected to said high pressure conduit,
  (3) a rotor turbine mounted on said block and fluidically connected to said hydraulic regulator to be operated by fluid from said hydraulic regulator,
  (4) a drive shaft mounted on said block and connected to said rotor turbine to be rotatably driven by said rotor turbine,
  (5) a gear assembly connected to said drive shaft to be operated by rotation of said drive shaft, and
  (6) a power output connection element connected to said gear assembly.

2. The motor defined in claim 1 further including a fan mounted on said block to cool said block, said fan being connected to said power source.

3. The motor defined in claim 2 further including a block water cooling system which includes water cooling conduits defined in said block, as source of cooling water connected to said water cooling conduits, and a water pump connected to said source of cooling water.

* * * * *